(12) United States Patent
Hirose

(10) Patent No.: US 8,740,703 B2
(45) Date of Patent: Jun. 3, 2014

(54) RANDOM DATA GENERATION

(75) Inventor: Haruto Hirose, Yokohama (JP)

(73) Assignee: Empire Technology Development LLC, Wilmington, DE (US)

( * ) Notice: Subject to any disclaimer, the term of this patent is extended or adjusted under 35 U.S.C. 154(b) by 0 days.

(21) Appl. No.: 13/642,115

(22) PCT Filed: Mar. 16, 2012

(86) PCT No.: PCT/US2012/029372
§ 371 (c)(1),
(2), (4) Date: Oct. 18, 2012

(87) PCT Pub. No.: WO2013/137901
PCT Pub. Date: Sep. 19, 2013

(65) Prior Publication Data
US 2013/0288796 A1    Oct. 31, 2013

(51) Int. Cl.
*A63F 13/00* (2014.01)
(52) U.S. Cl.
USPC .......................................................... 463/36
(58) Field of Classification Search
USPC .......................................... 463/21, 22, 31–37
See application file for complete search history.

(56) References Cited

U.S. PATENT DOCUMENTS

| 7,287,052 | B2 | 10/2007 | Chen et al. | |
|---|---|---|---|---|
| 7,895,640 | B2 | 2/2011 | Carlson | |
| 2003/0078101 | A1* | 4/2003 | Schneider et al. | 463/42 |
| 2008/0028012 | A1 | 1/2008 | Kato et al. | |
| 2010/0318492 | A1* | 12/2010 | Utsugi | 707/603 |
| 2011/0111833 | A1 | 5/2011 | Nordahl | |
| 2011/0131529 | A1* | 6/2011 | Doi et al. | 715/810 |
| 2012/0263310 | A1* | 10/2012 | Fournel | 381/61 |

FOREIGN PATENT DOCUMENTS

JP   2003-260174   9/2003

OTHER PUBLICATIONS

International Search Report and Written Opinion from International Application No. PCT/US2012/029372 mailed Jun. 13, 2012.
"Play Truly Random", http: http://www.playtrulyrandom.com/. 2008-2012.
Andreas Schiffler, "Physical Entropy in Computer Games", Nov. 2008. http://planetary-collegium.org/fileadmin/presentations/andreas%20schiffler.pdf.

* cited by examiner

*Primary Examiner* — Ronald Laneau
(74) *Attorney, Agent, or Firm* — Brundidge & Stanger, P.C.

(57) ABSTRACT

Technologies are described for generating random data. In some examples, a gaming device may include a game execution module, an extraction module, and a data generator. The game execution module may be configured to provide at least one player with a gaming service by continuously determining a plurality of parameters associated with the at least one player in a game operated by the at least one player. The extraction module may be configured to extract individual parameters from the plurality of determined parameters, the individual parameters having decorrelation with each other from a probability distribution perspective. The data generator may be configured to generate data items based on one or more of the extracted individual parameters, the data items being the extracted individual parameters or results of processing performed on the extracted individual parameters.

21 Claims, 7 Drawing Sheets

Figure 3

PLAYER DATA (131)

| ATTRIBUTES (301) | | | | PARAMETERS (303) | |
|---|---|---|---|---|---|
| GAME EXPERIENCE | ... | AGE | GENDER | EXPERIENCE POINTS | PHYSICAL STRENGTH POINTS |
| 8 MONTHS | ... | 20'S | MALE | PLAYER A | 13019 | 658 |
| 16 MONTHS | ... | 30'S | FEMALE | PLAYER B | 112975 | 8098 |
| ... | ... | ... | ... | ... | ... |
| 21 DAYS | ... | 10'S | MALE | PLAYER N | 91723 | 6271 |

PARAMETER SET FOR PLAYER N

*Note: PLAYER A, PLAYER B, ..., PLAYER N appear as row labels between the Attributes and Parameters sections.*

US 8,740,703 B2

RANDOM DATA GENERATION

BACKGROUND

Random data is well known for being used in, for example, simulations or probability calculations. Since generating truly random data is difficult, pseudo-random numbers computed or generated by computers are commonly-used as the random data. However, using pseudo-random numbers often causes an increase in the amount of computation and a reduction in accuracy in the computation results, because the computation results may converge on unrealistic local solutions.

In view of the above, various hardware and software solutions have been adopted for accurately generating random data. For example, achieving TFlops computation capabilities and speeding up inter-PU (Processing Unit) communications have been adopted as hardware solutions, and modified algorithms for the modified Newton method have been adopted as software solutions. Even thermal phenomena in semiconductor devices have been used for generating random data.

These approaches, however, do not suffice from the perspectives of convenience and cost, and there is a demand for new approaches. Whatever the benefits of previous random data generating techniques they do not share the advantages of the following techniques and tools.

BRIEF DESCRIPTION OF DRAWINGS

FIG. 3 is an example of player data arranged in accordance with the present disclosure.

DETAILED DESCRIPTION

Figure 1:
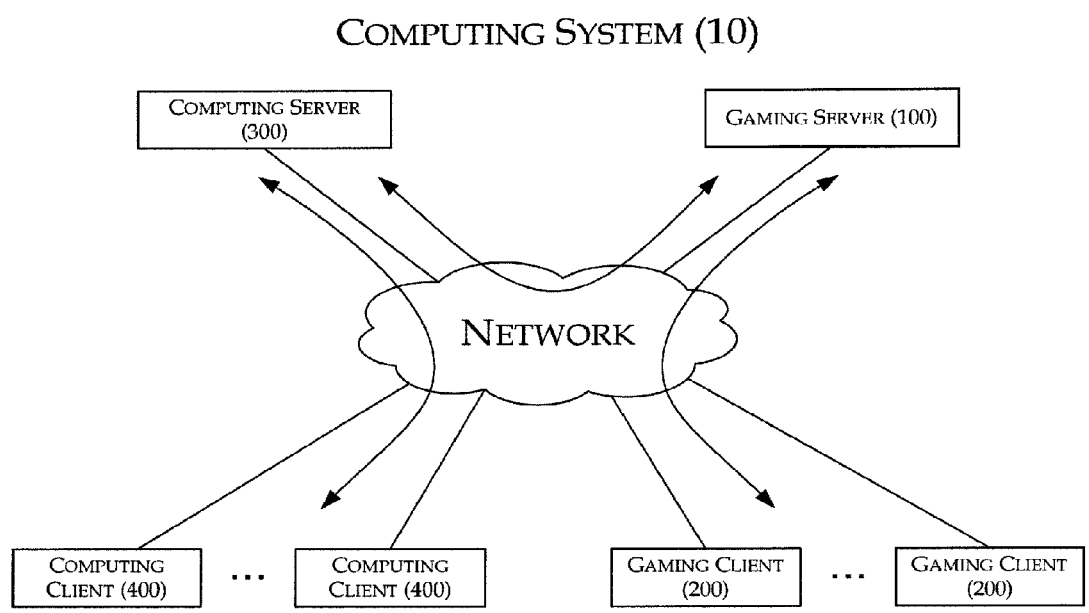
FIG. 1 is a schematic diagram showing an example of a computing system arranged in accordance with the present disclosure.

In the following detailed description, reference is made to the accompanying drawings, which form a part hereof. In the drawings, similar symbols typically identify similar components, unless context dictates otherwise. Further, the drawings are intended to be explanatory and may not be drawn to scale. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

In general, according to one non-limiting embodiment, a computing system comprises a gaming device and a computing device. The gaming device is configured to provide at least one player with a gaming service. The gaming device includes a game execution module, an extraction module, a data generator, and a first communication module.

The game execution module is configured to provide the at least one player with the gaming service by determining a plurality of parameters associated with the at least one player in a game operated by the at least one player. The extraction module is configured to extract individual parameters from the plurality of determined parameters, the individual parameters having decorrelation with each other from a probability distribution perspective. The data generator is configured to generate data items based on one or more of the extracted individual parameters, the data items including the extracted individual parameters or results of processing performed on the extracted individual parameters. The first communication module is configured to receive a request for the data items from the computing device and to send the data items to the computing device.

The computing device is configured to communicate with the gaming device. The computing device includes a second communication module. The second communication module is configured to send the request for the data items to the gaming device and to receive the data items from the gaming device.

1. Computing System

A. Configuration of the Computing System

FIG. 1 is a schematic diagram showing a non-limiting example of a computing system 10 arranged in accordance with the present disclosure. The computing system 10 may include a gaming server 100, one or more gaming clients 200, a computing server 300, and one or more computing clients 400. The gaming server 100, the gaming clients 200, the computing server 300, and the computing clients 400 may be of any type including, but not limited to, a mobile device, a personal computer, or a server, and may communicate with each other through a network, including, but not limited to, the Internet.

The gaming server 100 may provide one or more players with a cloud or network gaming service (e.g., a role playing game service). The players may access the gaming server 100 using the gaming clients 200. To provide the gaming service, the gaming server 100 may determine parameters (e.g., experience points, physical strength points, etc.) associated with the respective players in a game operated by the players. Further, the gaming server 100 may generate and output random data items. The gaming server may generate the random data items based on the determined parameters.

The computing server 300 may provide one or more users with a cloud or network computing service. The users may access the computing server 300 using the computing clients 400.

B. Example of Processing by the Computer System

The gaming server 100 may record transitions of parameters for the respective players, such as experience points and physical strength points of the players (i.e., pertaining to the players' roles in the role playing game). Meanwhile, the players may play the game in a routine manner. Additionally, the gaming server 100 may calculate and save the probability distribution of the parameters. The gaming server 100 may screen out the parameters that cause non-deterministic behavior (e.g., the parameters that are unlike the random data).

Each time the gaming server 100 receives a request from the computing server 300, the gaming server 100 may provide values (the random data items) randomly and infinitely without the player being made aware. This is because the random data items may be generated based on the parameters determined by the operations of a large number of players and the operations by the players may include a theoretically unpredictable level of randomness.

Thus, the computing server 300 may perform scientific computations, such as converging computations or the Monte Carlo method, by using the data items that may be considered to be random data taken from the natural world. In the case of converging computations such as the Newton method, a computation start point (initial value) and a steepest descent vector may be computed by using the random data items as the random data. In the case of the Monte Carlo method, the computing server 300 may also use the random data items as the random data.

The Newton method is a method for finding successively better approximations to the roots of a real-valued function. One may start with a computation start point, then the function is approximated by its tangent line, and one may compute the x-intercept of this tangent line. This x-intercept may typically be a better approximation to the function's root than the original point, and the method may be iterated.

The Monte Carlo method is a class of computational algorithm methods that rely on repeated random sampling to compute their results. One may define a domain of possible inputs, and generate inputs (random data) over the domain. One may perform deterministic computation on the inputs, and aggregate the computation results. The Monte Carlo method is useful for simulating phenomena with significant uncertainty in inputs and systems with a large number of coupled degrees of freedom.

Accordingly, the computing server 300 may be able to use the data items as random data from the natural world in various computations requiring random data, such as the converging computations or the Monte Carlo method, because the data items are not made by a predetermined algorithm. Thus, it is possible to avoid failing to converge or remaining at a physically meaningless local solution, which would occur with an ordinary algorithm due to the complexity of the computation, and also to find a new local solution.

2. Gaming Server

A. Configuration of the gaming server

Figure 2:
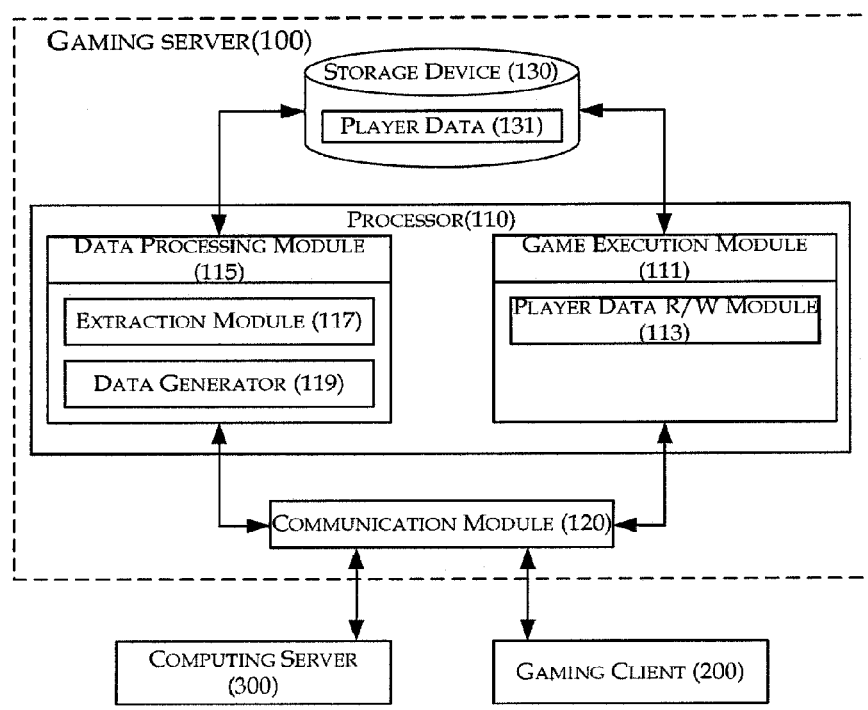
FIG. 2 is a block diagram illustrating an example of a gaming server that is arranged for a computing system in accordance with the present disclosure.

FIG. 2 is a block diagram illustrating a non-limiting example of the gaming server 100 that is arranged for a computing system 10 in accordance with the present disclosure. The gaming server 100 may include a processor 110 that, itself, includes a game execution module 111, a data processing module 115, a communication module 120, and a storage device 130.

The game execution module 111 may be a module to be executed by the processor 110 to provide one or more players with the gaming service (e.g., a role playing game) by determining parameters associated with the respective players. The game execution module 111 may determine parameters such as the experience points and physical strength points of the players (i.e. the roles in the role playing game) based on the operations of the players as needed. Experience points may be values for quantifying the roles' progression through the game and may generally be awarded for the completion of quests, overcoming obstacles and opponents, and for successful role-playing. Physical strength points may be finite values used to determine the amount of damage a role is able to withstand. Physical strength points may be replenished by using a restorative item or utilizing healing magic in the game.

Further, the game execution module 111 may include a player data R/W (read/write) module 113 that may write player data 131, including the determined parameters, on the storage device 130 and read the player data 131 from the storage device 130.

The data processing module 115 may be a module to be executed by the processor 110 to generate the random data items based on the parameters included in the player data 131. The data processing module 115 may include an extraction module 117 and a data generator 119.

The extraction module 117 may access the storage device 130 and extract suitable parameters from the player data 131 stored in the storage device 130. As a non-limiting example, the extraction module 117 may extract the parameters of N (with N being a positive integer and configurable) players having a highest level of variation against time, and/or extract the parameters of N (with N being a configurable and positive integer) players based on one or more attributes (including, without limitation, gender, age, game experience) of the players. Further, the extraction module 117 may screen out the parameters that cause non-deterministic behavior based on the distribution, such as a Poisson distribution. In case of using a Poisson distribution, the extraction module 117 may extract the parameters so that the transitions of the parameters will form the Poisson distribution.

The communication module 120 may be a communication interface used for communication through a network to provide the gaming service to the gaming clients 200 using the game execution module 111. Additionally, the communication module 120 may receive a request for the random data items from the computing server 300 and send (output) the random data items generated by the data generator 119 to the computing server 300.

The storage device 130 may store the player data 131 therein. The player data 131 may include parameters and attributes for the respective players as will be discussed in Section B. Each of the parameters may have decorrelation with each other from a probability distribution perspective, because each parameter may be unpredictably determined by the operation of each of the unrelated players.

B. Player Data

FIG. 3 is a non-limiting example of player data 131 stored in the gaming server 100 arranged in accordance with the present disclosure. As shown in FIG. 3, the player data 131 may be a table including attributes 301 and parameters 303 that are associated with the respective players.

The attributes 301 may indicate properties for the respective game players. As a non-limiting example, the attributes 301 may include gender, age, and game experience. Attribute values are set for the respective attributes 301 and the respective players. For example, as shown in FIG. 3, the attribute value, "Male", is set for the "Gender" attribute, the attribute value, "20's", is set for the "Age" attribute, and the attribute value, "8 months", is set for the "Game Experience" attribute respectively for player A.

The parameters 303 may indicate values set for the roles (the characters played by the players). As a non-limiting example, the parameters 303 may include experience points, and physical strength points. Values of the parameters 303 may be set for respective players (the roles) and determined as needed based on the operations of the players through the game execution module 111, as discussed above. In the non-limiting example shown in FIG. 3, the parameter value, "13019", may be set for the "Experience Points" parameter and the parameter value, "658", is set for the "Physical Strength Points" parameter. The values of the parameters 303 for the respective players may be referred to "a parameter set".

Thus, the player data 131 may be used by the game execution module 111 to identify the players having the attributes 301 and determine the status of the players (the roles) having the parameters 303. Further, the player data 131 may be used to generate one or more random data items by using the data processing module 115.

3. Computing Server

Figure 4:
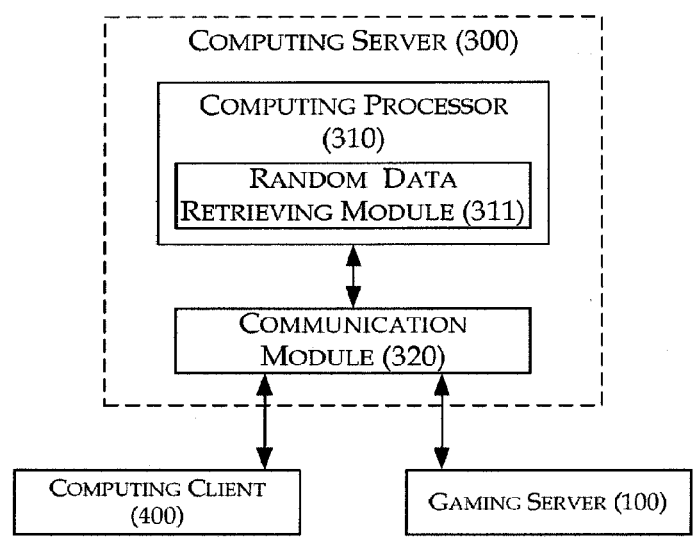
FIG. 4 is a block diagram illustrating an example of a computing server that is arranged for a computing system in accordance with the present disclosure.

FIG. 4 is a block diagram illustrating a non-limiting example of the computing server 300 that is arranged for a computing system 10 in accordance with the present disclosure. The computing server 300 may include a computing processor 310 that, itself, includes a random data retrieving module 311 and a communication module 320.

The computing processor 310 may provide a computing service to the computing client 400 and perform scientific computing, such as converging computations and the Monte Carlo method, in response to a request from the computing client 400. The computing processor 310 may use the random data items retrieved from the gaming server 100 as random data for the computing.

The random data retrieving module 311 may be a module to be executed by the computing processor 310 to command the communication module 320 to send a request for the random data item(s) when random data is required for the computing by the computing processor 310.

The communication module 320 may be a communication interface used for communication through a network to provide the computing service to the one or more computing clients 400 using the computing processor 310. Further, the communication module 320 may send a request for the random data items according to the command from the random data retrieving module 311 and receive the random data items from the gaming server 100.

4. Flow of Processing

Figure 5:
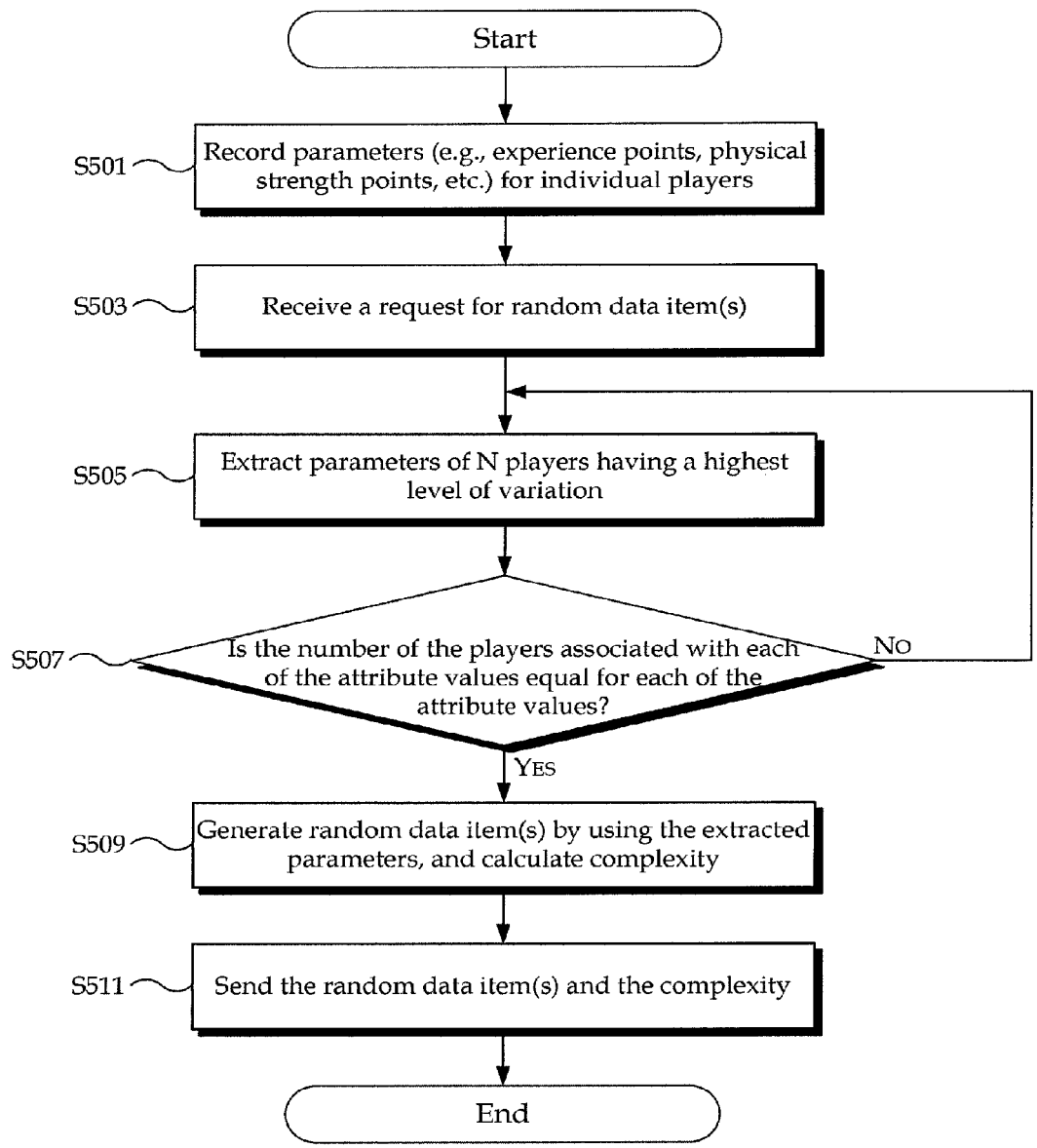
FIG. 5 is a flow chart illustrating an example of a method that is arranged for a computing system in accordance with the present disclosure.

FIG. 5 is a flow chart illustrating a non-limiting example of a method that is arranged for the computing system 10 in accordance with the present disclosure. The method may be performed under the control of the gaming server 100.

Referring to FIG. 5, at S501, the gaming execution module 111 may record (write) parameters, e.g., regarding the experience points and the physical strength points, for individual players in the player data 131, on the storage device 130. The parameters may be determined by the gaming execution module 111 as needed based on the operations of the individual players.

At S503, the communication module 120 may receive a request for one or more random data items from the computing server 300. The computing server 300 may send the request for the random data item when needed. After receiving the request, at S505, the extraction module 117 may extract parameters of N (with N being a configurable and positive integer) players having a highest level of variation against time, so as to extract the parameters having a largest change over a predetermined amount of time. The extracted individual parameters have decorrelation with each other from a probability distribution perspective. Further, at 5507, the extraction module 117 may check at least one attribute of players associated with the extracted parameters. Specifically, the extraction module 117 may determine whether the number of the players associated with each of the attribute values is equal for each of the attribute values. If necessary, the extracting module 117 may check M (with M being a configurable and positive integer) attribute types (e.g., "Gender", "Age", and "Game Experience").

As a non-limiting example, in the case of using the "Gender" attribute, the extraction module 117 may examine the number of the players having the attribute value, "Male", and the number of the players having the attribute value, "Female", for the players associated with the extracted parameters. If the number of the "Male" players is not equal to the number of the "Female" players, the extraction module 117 may extract the parameters again at 5505. If the number of the "Male" players is equal to the number of the "Female" players, the data generator 119 may, at S509, generate the random data items by using the extracted parameters. A number of generating methods may be utilized. For example, the data generator may use the parameters as the random data items without change, or generate the random data items by arithmetic processing of the individual parameters or by combining the individual parameters to achieve a predetermined digit number. Examples of the arithmetic processing include, but are not limited to, NAND operation, NOR operation, AND operation, OR operation, addition, subtraction, multiplication, and division.

If necessary, the data processing module 115 may calculate complexity, such as Kolmogorov complexity, and determine the appropriateness of it. The Kolmogorov complexity of an object (e.g. the random data items) is a measure of the computational resources required to specify the object.

Finally, the communication module 120 may, at S511, send the generated one or more random data items to the computing server 300. The communication module 120 may also send the complexity with the random data items.

One skilled in the art would appreciate that, for this and other processes and methods disclosed herein, the functions performed in the processes and methods may be implemented in differing order. Furthermore, the outlined steps and operations are only provided as non-limiting examples, and some of the steps and operations may be optional, combined into fewer steps and operations, or expanded into additional steps and operations without detracting from the essence of the disclosed embodiments.

5. Non-Limiting Example of Processing

Figure 6:
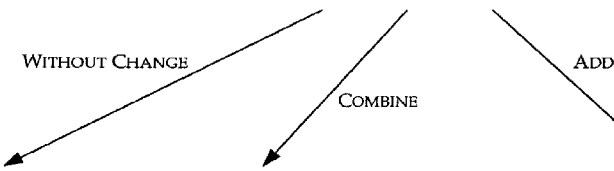
FIG. 6 is a schematic diagram showing an example of a process that is arranged for a computing system in accordance with the present disclosure.

FIG. 6 is a schematic diagram showing a non-limiting example of a process that is arranged for the computing system 10 in accordance with the present disclosure. In this non-limiting example, the player data 131 includes a "Gender" attribute and "Experience Points" and "Physical Strength Points" parameters.

The extraction module 117 may extract parameters of N (in this non-limiting example, N=4) players from the player data 131 so that the parameters extracted have a highest level of variation against time among the parameters 303, and the number of male players associated with the extracted parameters is equal to the number of female players associated with the extracted parameters.

In this non-limiting example, the extraction module 117 may extract parameters of Player X1, Player X2, Player X3, and Player X4. The data generator 119 may generate one or more random data items from the extracted parameters either "Without Change" or by "Combine" or "Add" (an example of arithmetic processing).

In the non-limiting example shown in FIG. 6, in the case of "Without Change" being applicable, the extraction module 117 may generate the random data items by lining up Player X1's parameter set, "9381" and "1091", Player X2's parameter set, "212791" and "10980", Player X3's parameter set, "76812" and "57816", and Player X4's parameter set, "27" and "87" without change.

In the non-limiting example shown in FIG. 6, in the case of "Combine" being applicable, the extraction module 117 may generate the random data items by combining the individual parameters to achieve a number having a predetermined number of digits (10 digits in the non-limiting example shown in FIG. 6). Specifically, the first random data item "9381109121" (10 digits) may be made by combining Player X1's parameter set "9381" and "1091" and the first two digits of Player X2's experience points "212791". The second random data item "2791109807" (10 digits) may be made by combining the remaining 4 digits of Player X2's experience points "212791", Player X2's physical strength points "10980" and the first digit of Player X3's experience points "76812". The third random data item "6812578162" (10 digits) may be made by combining the remaining 4 digits of Player X3's experience points "76812", Player X3's physical strength points "57816" and the first digit of Player X4's experience points "27".

In the non-limiting example shown in FIG. 6, in the case of "Add" being applicable, the extraction module 117 may generate the random data items by adding the individual parameters of the respective players' parameter sets. Specifically, the first random data item "10421" may be made by adding Player X1's parameter set, "9381" and "1091". The second random data item "223771" may be made by adding Player X2's parameter set, "212791" and "10980". Similarly, the third random data item "134628" may be made by adding Player X3's parameter set, "76812" and "57816" And the fourth random data item "114" may be made by adding Player X4's parameter set, "27" and "87".

Accordingly, the computing server 300 may be able to use the data items as random data from the natural world because the data items are not made by a predetermined algorithm but may instead be made from the parameters determined by the operation of each of the unrelated players. Further, if the data items are generated by changing parameters (in the non-limiting example shown in FIG. 6, "Combine" or "Add"), values of the data items may become more meaningless and random than the parameters themselves and thus may be good for being used as random data.

One skilled in the art would appreciate that, for this and other processes and methods disclosed herein, parameters, attributes, and methods may be implemented in a different form. Further, these outlined steps and operations are only provided as non-limiting examples.

6. Example of the Gaming Device

Figure 7:
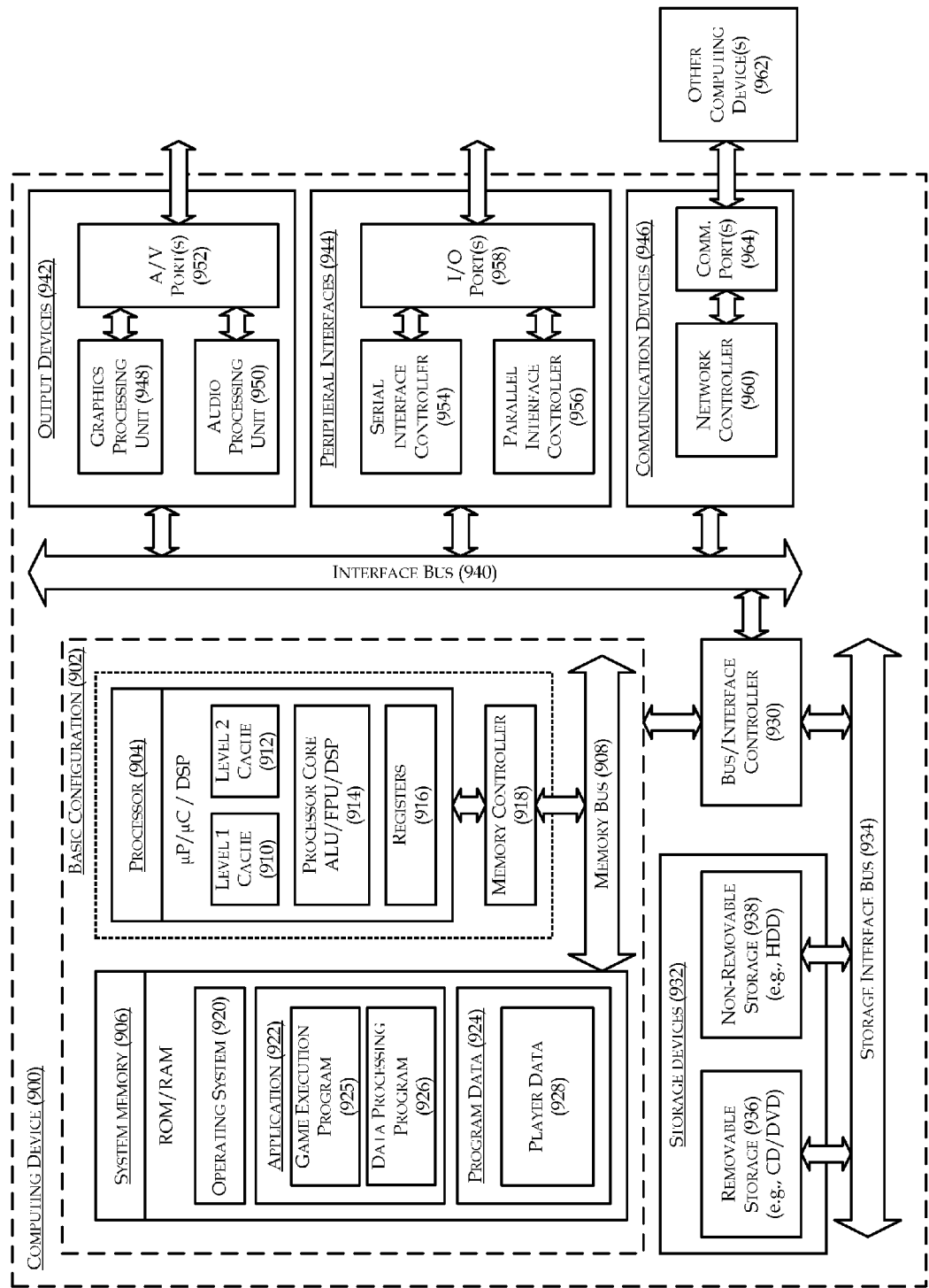
FIG. 7 is a block diagram of an example computing device that is arranged for a computing system in accordance with the present disclosure.

FIG. 7 is a block diagram illustrating a non-limiting example of a computing device 900 that is arranged for the gaming device in accordance with the present disclosure. In a very basic configuration 902, computing device 900 typically includes one or more processors 904 and a system memory 906. A memory bus 908 may be used for communicating between the processor 904 and system memory 906.

Depending on the desired configuration, the processor 904 may be of any type including, but not limited to, a microprocessor (µP), a microcontroller (µC), a digital signal processor (DSP), or any combination thereof. The processor 904 may include one more levels of caching, such as a level one cache 910 and a level two cache 912, a processor core 914, and registers 916. A non-limiting example of the processor core 914 may include an arithmetic logic unit (ALU), a floating point unit (FPU), a digital signal processing core (DSP Core), or any combination thereof. A non-limiting example of a memory controller 918 may also be used with the processor 904, or in some implementations the memory controller 918 may be an internal part of the processor 904.

Depending on the desired configuration, the system memory 906 may be of any type including, but not limited to, volatile memory (such as RAM), non-volatile memory (such as ROM, flash memory, etc.) or any combination thereof. The system memory 906 may include an operating system 920, one or more applications 922, and program data 924. The application 922 may include a game execution program 925 that is arranged to perform the functions as described herein including those described with respect to the game execution module 111 in FIG. 2 and a data processing program 926 that is arranged to perform the functions as described herein including those with respect to the data processing module 115 in FIG. 2. Program data 924 may include player data 928 that may be useful for generating one or more random data items as is described herein. In some embodiments, the application 922 may be arranged to operate with the program data 924 on the operating system 920 such that implementation of a method of generating one or more random data items may be provided as described herein. This described basic configuration 902 is illustrated in FIG. 7 by those components within the inner dashed line.

The computing device 900 may have additional features or functionality, and additional interfaces to facilitate communications between the basic configuration 902 and any required devices and interfaces. For example, a bus/interface controller 930 may be used to facilitate communications between the basic configuration 902 and one or more data storage devices 932 via a storage interface bus 934. The data storage devices 932 may be removable storage devices 936, non-removable storage devices 938, or a combination thereof. Non-limiting examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Non-limiting examples of computer storage media may include volatile and nonvolatile, removable and non-removable media implemented in any method or technology for storage of information, such as computer readable instructions, data structures, program modules, or other data.

The system memory 906, removable storage devices 936 and non-removable storage devices 938 are non-limiting examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by the computing device 900. Any such computer storage media may be part of the computing device 900.

The computing device 900 may also include an interface bus 940 for facilitating communication from various interface devices (e.g., output devices 942, peripheral interfaces 944, and communication devices 946) to the basic configuration 902 via the bus/interface controller 930. A non-limiting example of the output devices 942 includes a graphics processing unit 948 and an audio processing unit 950, which may be configured to communicate to various external devices such as a display or speakers via one or more A/V ports 952. A non-limiting example of the peripheral interfaces 944 includes a serial interface controller 954 or a parallel interface controller 956, which may be configured to communicate with external devices such as input devices (e.g., keyboard, mouse, pen, voice input device, touch input device, etc.) or other peripheral devices (e.g., printer, scanner, etc.) via one or more I/O ports 958. A non-limiting example of the communication devices 946 includes a network controller 960, which may be arranged to facilitate communications with one or more other computing devices 962 over a network communication link via one or more communication ports 964.

The network communication link may be one non-limiting example of a communication media. Communication media may typically be embodied by computer readable instructions, data structures, program modules, or other data in a modulated data signal, such as a carrier wave or other transport mechanism, and may include any form of information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 900 may be implemented as a portion of a small-form factor, portable (or mobile) electronic device, such as a cell phone, a personal data assistant (PDA), a personal media player device, a wireless web-watch device, a personal headset device, an application specific device, or a hybrid device that includes any of the above functions. The computing device 900 may also be implemented as a personal computer, including both laptop computer and non-laptop computer configurations.

7 Additional Statement

As a result of the various configurations described in detail above, the present disclosure may include one or more of the following advantages, some of which have been discussed above. According to the present disclosure, the random data items are derived from the parameters determined based on the unpredictable operation of the game players. Thus, there is no need to be concerned about the periodicity of the data items and the random data items can be considered to be random data taken from the natural world. Further, there is a possibility of performing calculations using the random data items in a range that cannot reached with an ordinary algorithm. Thus, there is a possibility of reaching new and unknown local solutions. Furthermore, it is possible for a game service provider to gain new income via usage of a random data item outputting service.

While descriptions with respect to only a limited number of embodiments have been disclosed herein, those skilled in the art, having the benefit of this disclosure, would appreciate that other embodiments can be devised which do not depart from the scope of the embodiments disclosed herein. Accordingly, the scope of the embodiments should be limited only by the attached claims.

The invention claimed is:

1. A gaming device, comprising:
a game execution module configured to provide at least one player with a gaming service by continuously determining a plurality of parameters associated with the at least one player in a game operated by the at least one player;
an extraction module configured to extract individual parameters from the plurality of determined parameters, the individual parameters having decorrelation with each other from a probability distribution perspective; and
a data generator configured to generate data items based on one or more of the extracted individual parameters, the data items being the extracted individual parameters or results of processing performed on the extracted individual parameters.

2. The gaming device of claim 1, wherein the extraction module is configured to extract the individual parameters having a highest level of variation.

3. The gaming device of claim 1,
wherein an attribute of each of the players who joins the gaming service is defined to have an attribute value, and
wherein the extraction module is further configured to extract the individual parameters based on the attribute values, and
wherein the individual parameters include parameter sets, each of the parameter sets being associated with the players who are associated with each of the attribute values of the attribute.

4. The gaming device of claim 3, wherein a number of the players who are associated with each of the attribute values is equal for each of the attribute values.

5. The gaming device of claim 3, wherein the attribute is for at least one of gender, game experience, or age.

6. The gaming device of claim 1, wherein the game execution module is further configured to provide the gaming service via a network.

7. The gaming device of claim 1, wherein the data generator is configured to generate the data items by arithmetic processing of the individual parameters.

8. A computing system, comprising:
a gaming device configured to provide at least one player with a gaming service, comprising:
a game execution module configured to provide the at least one player with the gaming service by determining a plurality of parameters associated with the at least one player in a game operated by the at least one player,
an extraction module configured to extract individual parameters from the plurality of determined parameters, the individual parameters having decorrelation with each other from a probability distribution perspective,
a data generator configured to generate data items based on one or more of the extracted individual parameters, the data items being the extracted individual parameters or results of processing performed on the extracted individual parameters, and
a first communication module configured to receive a request for the data items from the computing device and to send the data items to the computing device; and
a computing device configured to communicate with the gaming device, comprising:
a second communication module configured to send the request for the data items to the gaming device and to receive the data items from the gaming device.

9. The computing system of claim 8, wherein the extraction module is further configured to extract the individual parameters having a highest level of variation.

10. The computing system of claim 8,
wherein an attribute of each of the players who joins the gaming service is defined to have an attribute value, and
wherein the extraction module is further configured to extract the individual parameters based on the attribute values, and
wherein the individual parameters include parameter sets, each of the parameter sets being associated with the players who are associated with each of the attribute values of the attribute.

11. The computing system of claim 10, wherein a numbers of the players who are associated with each of the attribute values is equal for each of the attribute values.

12. The computing system of claim 10, wherein the attribute is for at least one of gender, game experience, or age.

13. The computing system of claim 8, wherein the game execution module is further configured to provide the gaming service via a network.

14. The computing system of claim 8, wherein the data generator is configured to generate the data items by arithmetic processing of the individual parameters.

15. A method performed by one or more processors, comprising:
providing, by the one or more processors, at least one player with a gaming service by continuously determining a plurality of parameters associated with the at least one player in a game operated by the at least one player;
extracting, by the one or more processors, individual parameters from the plurality of determined parameters, the extracted individual parameters having decorrelation with each other from a probability distribution perspective; and
generating data items based on one or more of the extracted individual parameters, the data items being the extracted individual parameters or results of processing performed on the extracted individual parameters.

16. The method of claim 15, wherein the extracting includes extracting the individual parameters having a highest level of variation.

17. The method of claim 15,
wherein an attribute of the each of the players who joins the gaming service is defined to have an attribute value, and
wherein the extracting the individual parameters is based on the attribute values, and
wherein the individual parameters include parameter sets, each being associated with the players who are associated with each of the attribute values of the attribute.

18. The method of claim 17, wherein a number of the players who are associated with each of the attribute values is equal for each of the attribute values.

19. The method of claim 17, wherein the attribute is for at least one of gender, game experience, or age.

20. The method of claim 15, wherein the gaming service is provided via a network.

21. The method of claim 15, wherein the data items are generated by arithmetic processing of the individual parameters.

* * * * *

UNITED STATES PATENT AND TRADEMARK OFFICE
CERTIFICATE OF CORRECTION

PATENT NO. : 8,740,703 B2  
APPLICATION NO. : 13/642115  
DATED : June 3, 2014  
INVENTOR(S) : Hirose Page 1 of 1

It is certified that error appears in the above-identified patent and that said Letters Patent is hereby corrected as shown below:

In the Specification

Column 5, Line 56, delete "5507," and insert -- S507, --, therefor.

Column 6, Line 5, delete "5505." and insert -- S505. --, therefor.

Signed and Sealed this  
Twenty-eighth Day of October, 2014

Michelle K. Lee  
*Deputy Director of the United States Patent and Trademark Office*